United States Patent
Drucker et al.

(10) Patent No.: US 7,271,811 B2
(45) Date of Patent: *Sep. 18, 2007

(54) VIEW DEPENDENT TILED TEXTURES

(75) Inventors: Steven M. Drucker, Bellevue, WA (US); James M. Mahoney, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 15 days.

This patent is subject to a terminal disclaimer.

(21) Appl. No.: 11/271,240

(22) Filed: Nov. 10, 2005

(65) Prior Publication Data

US 2006/0061585 A1    Mar. 23, 2006

Related U.S. Application Data

(63) Continuation of application No. 09/195,728, filed on Nov. 18, 1998, now Pat. No. 7,071,949.

(51) Int. Cl.
    *G09G 5/00* (2006.01)
(52) U.S. Cl. ...................................... 345/585; 345/588
(58) Field of Classification Search ................ 345/427, 345/585, 588
    See application file for complete search history.

(56) References Cited

U.S. PATENT DOCUMENTS

| | | | |
|---|---|---|---|
| 4,615,013 A * | 9/1986 | Yan et al. ..................... 345/582 |
| 5,080,368 A * | 1/1992 | Weisser ....................... 273/241 |
| 5,181,108 A | 1/1993 | Greene |
| 5,222,205 A | 6/1993 | Larson et al. |
| 5,574,836 A * | 11/1996 | Broemmelsiek ............. 345/427 |
| 5,579,456 A * | 11/1996 | Cosman ....................... 345/419 |
| 5,601,431 A | 2/1997 | Howard |
| 5,613,048 A | 3/1997 | Chen et al. |
| 5,616,079 A | 4/1997 | Iwase et al. |
| 5,689,287 A * | 11/1997 | Mackinlay et al. .......... 345/427 |
| 5,786,822 A | 7/1998 | Saskaibara et al. |
| 5,912,671 A | 6/1999 | Oka |
| 5,933,148 A * | 8/1999 | Oka et al. .................... 345/427 |
| 5,995,119 A | 11/1999 | Cosatto et al. |
| 6,005,969 A | 12/1999 | Thomas et al. |
| 6,049,337 A | 4/2000 | Van Overveld |
| 6,054,999 A | 4/2000 | Strandberg |
| 6,084,979 A | 7/2000 | Kanade et al. |
| 6,166,748 A | 12/2000 | Van Hook et al. |
| 6,549,200 B1 | 4/2003 | Mortlock et al. |

OTHER PUBLICATIONS

Halle, M., "Multiple Viewpoint Rendering," Proceedings of the 25th annual conference on Computer Graphics and Interactive Techniques, Jul. 1998, pp. 243-254.

* cited by examiner

*Primary Examiner*—Ryan Yang

(57) ABSTRACT

An array of view-dependent sprited tiles provide different views of an image texture (e.g., structure, color, shading, illumination, transparency, as well as other image attributes). The different views of the image texture correspond to different viewing angles at which a user would see the tiles when they are applied to an image geometry. In one implementation, the view dependent sprited tiles are two-dimensional projections of three-dimensional structures. The projections maintain the dimensions (including shape) of the front surfaces of three-dimensional structures at different viewing angles. A projection that meets these characteristics is the oblique parallel projection.

19 Claims, 9 Drawing Sheets

VIEW DEPENDENT TILED TEXTURES

CROSS REFERENCE TO RELATED APPLICATION

This application is a continuation of and claims the benefit of U.S. application Ser. No. 09/195,728, filed Nov. 18, 1998, titled VIEW DEPENDENT TILED TEXTURES, U.S. Pat. No. 7,071,949, which is incorporated herein by reference.

FIELD OF THE INVENTION

The present invention relates to tiled texture mappings in computer graphics displays and, in particular, to tiles that that are rendered according to different user viewing angles.

BACKGROUND AND SUMMARY OF THE INVENTION

In computer graphics texture mapping refers to adding texture, color, shading, illumination, transparency, as well as other image attributes, to the surface of an image geometry to increase the detail and realism in an image. (In this context, image geometry refers to an image surface to be rendered on a video display and is not a limited to image objects representing solid articles.) Commonly, texture mapping utilizes a texture tile (or tiled texture) that includes the image attributes of the texture and is typically smaller than the image geometry to which the texture mapping is applied. As a result, texture mapping often entails applying an array of many copies of the texture tile to the image geometry (i.e., tiling) to cover it with the image or surface texture. Texture mapping simplifies image processing by allowing image modeling calculations to be based on image geometries alone without also having to model relatively high resolution and complex surface details.

Conventional tiled textures and texture mapping suffers from relatively poor depth characteristics and therefore lack realism. An example of a common tiled texture that commonly suffers from these disadvantages is a brick wall. An actual brick wall is characterized by rich three-dimensional structures in which adjacent bricks are separated by mortar. Typically, the mortar is recessed relative to the front major faces of the bricks. When viewed from most angles, the relative depths of the brick faces and mortar are plainly discernible.

Texture mapping is the general process of wrapping an image around a geometry and rendering the results. A conventional tiled texture is a single tile that is rendered repeatedly in an array to form an image. In conventional texture mapping for computer graphics, however, the depth characteristics of the typical tiled texture of for example a brick wall are lacking. In this example, the tile may be of a single brick or, more likely, is of a group of bricks mortared together. The tile may include apparent depth characteristics between the mortar and bricks included in the tile. Even with the apparent depth characteristics of such a tile the resulting tile mappings applied to image geometries lack apparent depth. Such texture mappings look like printed wall paper rather than a three-dimensional form.

In accordance with the present invention, the loss of the apparent depth in texture mappings may be averted by employing an array of view-dependent sprited tiles that provide different views of an image texture (e.g., structure, color, shading, illumination, transparency, as well as other image attributes). The different views of the image texture correspond to different viewing angles at which a user would see the tiles when they are applied to an image geometry. In one implementation, the viewing angles are based upon the horizontal angles (i.e., angles within a horizontal plane of a user's view) at which the user views the tiles. This implementation is considered to be view dependent in one (angular) dimension or, alternatively, a one-dimensional array of sprited tiles. Tiles in accordance with this invention can also be based upon other single angular dimensions (e.g., vertical and others) or multiple (e.g., two) viewing angle dimensions.

In one implementation, the view dependent sprited tiles are two-dimensional projections of three-dimensional structures. The typical projections for applying or projecting a three-dimensional structure onto a two-dimensional representation or image plane are the perspective projection and the orthographic projection. Neither projection is desirable for providing such view dependent sprited tiles. Whenever tiles formed by perspective or orthographic projections at different viewing angles are positioned together, image artifacts arising from inconsistencies in their views undermine the goal of improved depth characteristics.

In particular, tiles with perspective projections undergo second perspective projections after the tiles are applied to an image geometry, which results in undesirable image artifacts. Orthographic projections introduce apparent rotation of the image plane for different viewing angles. This apparent rotation can introduce changes in the apparent shapes of tiles that are near each other, but are viewed at different viewing angles. The image artifacts from perspective and orthographic projections can appear as inconsistencies in the appearances of adjacent tiles or in the appearance of the image geometry to which the tiles are applied.

To avoid such image artifacts, view dependent sprited tiles are formed in one implementation by oblique parallel projections. Oblique parallel projections do not introduce perspective foreshortening or apparent rotation of the image plane for different viewing angles. In view dependent sprited tiles that are two-dimensional projections of a three-dimensional structure, for example, and in which the three-dimensional structure has a front surface that is the generally major surface of the three-dimensional structures in the tiles (i.e., the surface that is about parallel to the plane of a tile), an oblique parallel projection maintains the dimensions (including shape) of the front surface at different viewing angles.

Additional objects and advantages of the present invention will be apparent from the detailed description of the preferred embodiment thereof, which proceeds with reference to the accompanying drawings.

DETAILED DESCRIPTION OF PREFERRED EMBODIMENT

Figure 1:
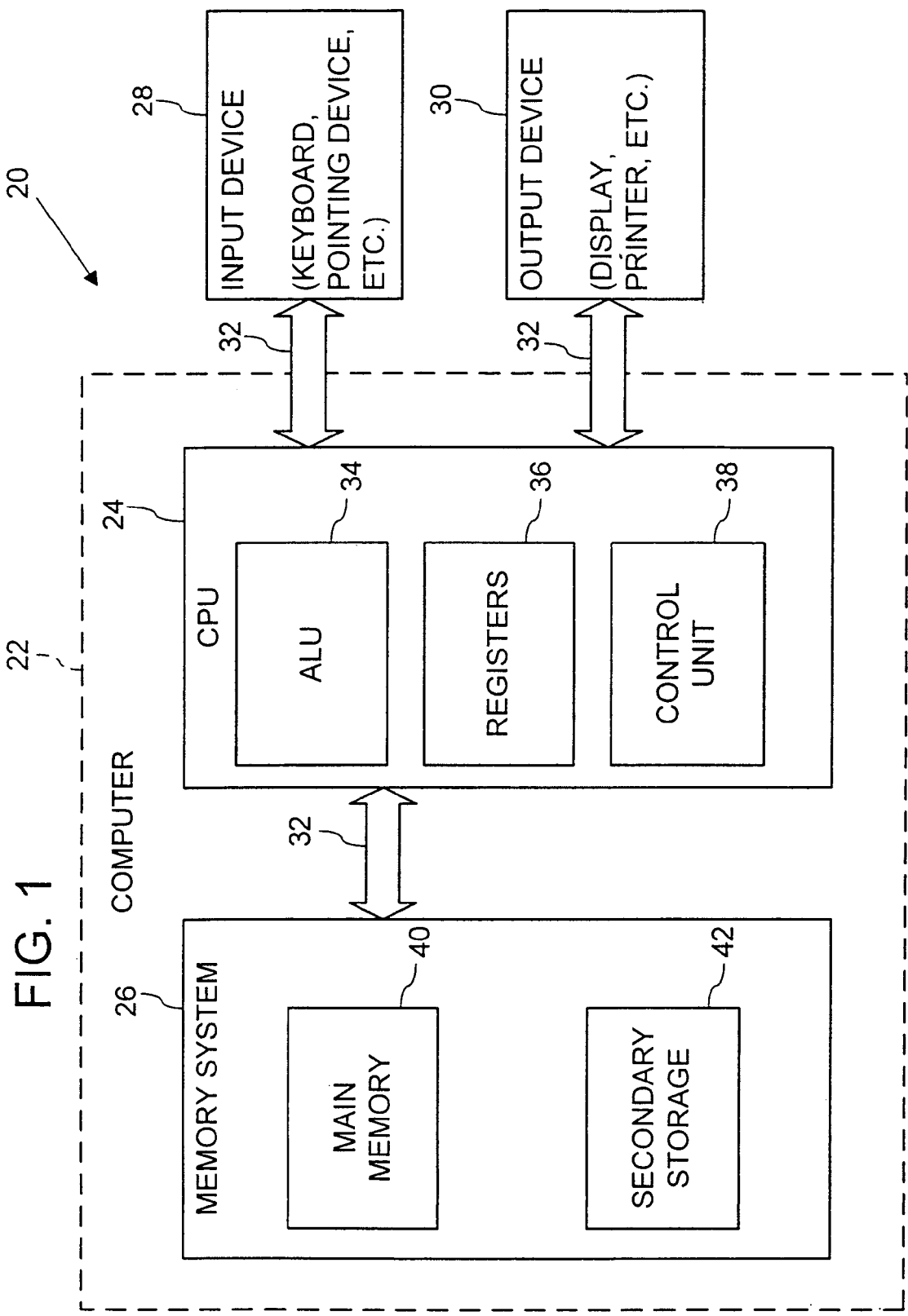
FIG. 1 is a block diagram of a computer system that may be used to implement the present invention.

FIG. 1 illustrates an operating environment for an embodiment of the present invention as a computer system 20 with a computer 22 that comprises at least one high speed processing unit (CPU) 24 in conjunction with a memory system 26, an input device 28, and an output device 30. These elements are interconnected by at least one bus structure 32.

The illustrated CPU 24 is of familiar design and includes an ALU 34 for performing computations, a collection of registers 36 for temporary storage of data and instructions, and a control unit 38 for controlling operation of the system 20. The CPU 24 may be a processor having any of a variety of architectures including Alpha from Digital, MIPS from MIPS Technology, NEC, IDT, Siemens, and others, x86 from Intel and others, including Cyrix, AMD, and Nexgen, and the PowerPC from IBM and Motorola.

The memory system 26 generally includes high-speed main memory 40 in the form of a medium such as random access memory (RAM) and read only memory (ROM) semiconductor devices, and secondary storage 42 in the form of long term storage mediums such as floppy disks, hard disks, tape, CD-ROM, flash memory, etc. and other devices that store data using electrical, magnetic, optical or other recording media. The main memory 40 also can include video display memory for displaying images through a display device. Those skilled in the art will recognize that the memory 26 can comprise a variety of alternative components having a variety of storage capacities.

The input and output devices 28 and 30 also are familiar. The input device 28 can comprise a keyboard, a mouse, a physical transducer (e.g., a microphone), etc. The output device 30 can comprise a display, a printer, a transducer (e.g., a speaker), etc. Some devices, such as a network interface or a modem, can be used as input and/or output devices.

As is familiar to those skilled in the art, the computer system 20 further includes an operating system and at least one application program. The operating system is the set of software which controls the computer system's operation and the allocation of resources. The application program is the set of software that performs a task desired by the user, using computer resources made available through the operating system. Both are resident in the illustrated memory system 26.

In accordance with the practices of persons skilled in the art of computer programming, the present invention is described below with reference to acts and symbolic representations of operations that are performed by computer system 20, unless indicated otherwise. Such acts and operations are sometimes referred to as being computer-executed and may be associated with the operating system or the application program as appropriate. It will be appreciated that the acts and symbolically represented operations include the manipulation by the CPU 24 of electrical signals representing data bits which causes a resulting transformation or reduction of the electrical signal representation, and the maintenance of data bits at memory locations in memory system 26 to thereby reconfigure or otherwise alter the computer system's operation, as well as other processing of signals. The memory locations where data bits are maintained are physical locations that have particular electrical, magnetic, or optical properties corresponding to the data bits.

Figure 2:
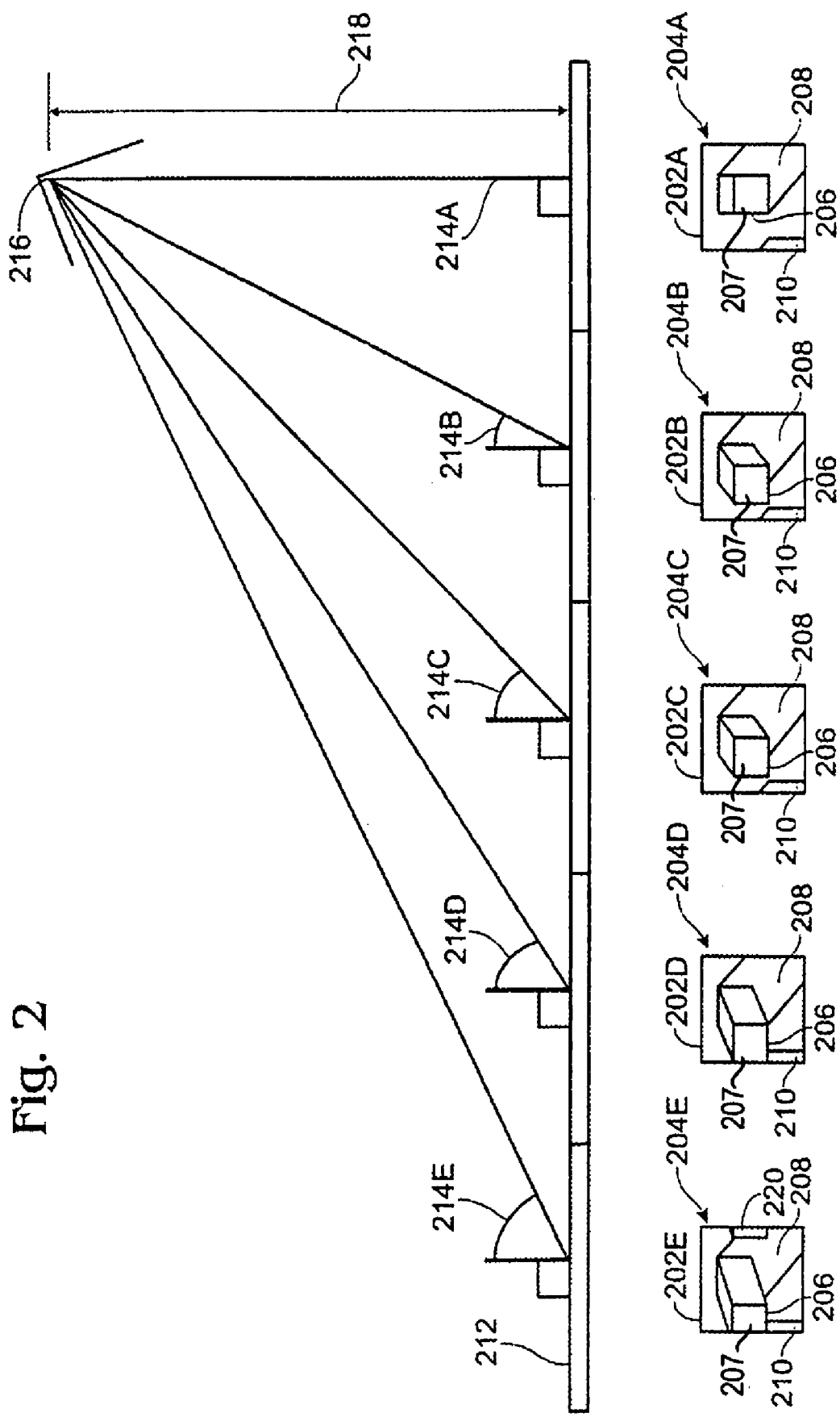
FIG. 2 is an illustration of an exemplary one-dimensional array of view-dependent sprited tiles having respective textures that are of a simplified texture structure in the form of a solid block casting a shadow.

FIG. 2 is an illustration of an exemplary array of view-dependent sprited tiles 202A-202E having respective textures 204A-204E that are of a simplified texture structure in the form of a solid block 206 having a front or outer surface 207 and casting a shadow 208. Front surface 207 is the generally major surface of block 206 in tiles 202. Shadow 208 represents the result of an illumination source (not shown) that enhances the representation of textures 204, as is common in the field of texture mapping. Shadow 208 extends beyond each of tiles 202 and is represented by a shadow segment 210 on each adjacent tile 202. In a texture mapping, sprited tiles 202 are applied to a surface of an image geometry to increase the detail and dynamic realism in an image rendered for a user on a display screen 212 (shown on edge). Tiles 202 are shown perpendicular to the plane of display screen 212 for purposes of illustration.

It will be appreciated that view-dependent sprited tiles according to the present invention could be of arbitrary complexity and include arbitrary levels of imaging detail and that the detail of textures 204 has been simplified for purposes of illustration. In this context, image geometry refers to an image surface to be rendered on a video display and is not limited to image objects representing solid articles.

Sprited tiles 202A-202E provide different views of the geometry of texture structure block 206 in respective textures 204A-204E. The different views of block 206 correspond to different viewing angles 214A-214E at which a user would see tiles 202 when they are applied to an image geometry. In this example, tiles 202 are two-dimensional projections of three-dimensional structures. Viewing angles 214 are determined with respect to a selected user viewpoint 216 that is assigned a preselected distance 218 from display screen 212. At the relatively large viewing angle 214D of tile 202D, for example, tile 202E includes a texture block segment 220 representing a partial overlap of texture structure 206 from adjacent tile 202D.

Figure 3:
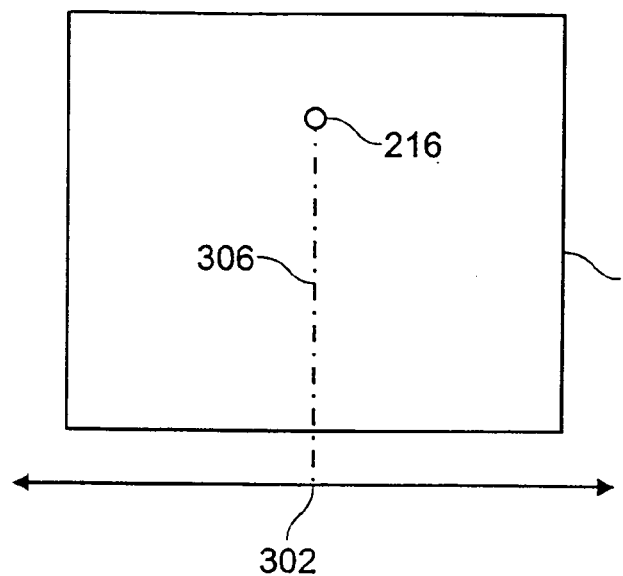
FIG. 3 is a front view of a display screen illustrating a user viewpoint.

FIG. 3 is a front view of display screen 212 illustrating user viewpoint 216. In addition to its distance 218 (shown in FIG. 2, extending out of the plane of FIG. 3) from display screen 212, user viewpoint 216 is also assigned preselected horizontal position 302 relative to a horizontal axis 304 across display screen 212. (For example, horizontal position 302 could be at a midway point across horizontal axis 304.)

Distance 218 and horizontal position 302 are selected to represent an average or typical viewing distance and position for many users.

Horizontal position 302 establishes user viewpoint 216 as a vertical line 306 that is parallel to display screen 212 and spaced apart from it by distance 218. In this implementation, the viewing angle 214 at a selected position on an image surface on display screen 212 is determined as the horizontal angle between a normal 220 extending from the image surface at the selected position and a viewing line 220 extending from the selected position to viewpoint 216. With their viewing angles 214 based upon horizontal angles alone, tiles 202 are considered to be view dependent in one (angular) dimension or, alternatively, a one-dimensional array of sprited tiles. Tiles in accordance with this invention can be based upon other single angular dimensions (e.g., vertical) or multiple (e.g., two) viewing angle dimensions, as described below in greater detail.

Multiple tiles 202 (e.g., 5-19 or more) may be determined or calculated prior to rendering for use over a range of viewing angles to provide a retained mode, real time rendering system. With the exemplary viewpoint 216 (i.e., viewpoint line 306) at about the horizontal middle of display screen 212, both positive and negative viewing angles 214 would be included in the range of viewing angles (e.g., ±52.5°), although only positive angles are shown. Accordingly, for the positive viewing angle of each tile 202, array 200 would typically include a tile 202 with a negative viewing angle of the same absolute value. This would reflect the typical user viewpoint 216 as being generally horizontally centered with regard to display screen 212.

In this implementation, each of tiles 202 would correspond to a particular viewing angle segment within the range of viewing angles 214. The viewing angle segments that are assigned to tiles 202 may be distributed uniformly over the viewing angle range (e.g., each tile 202 corresponds to a viewing angle segment of 50 over a range of ±52.5°) or may be distributed in any nonuniform manner. For example, the density of tiles may be concentrated near the normal (i.e., 0°) viewing angle to provide greater imaging quality according to the given texture and application.

Figure 4:
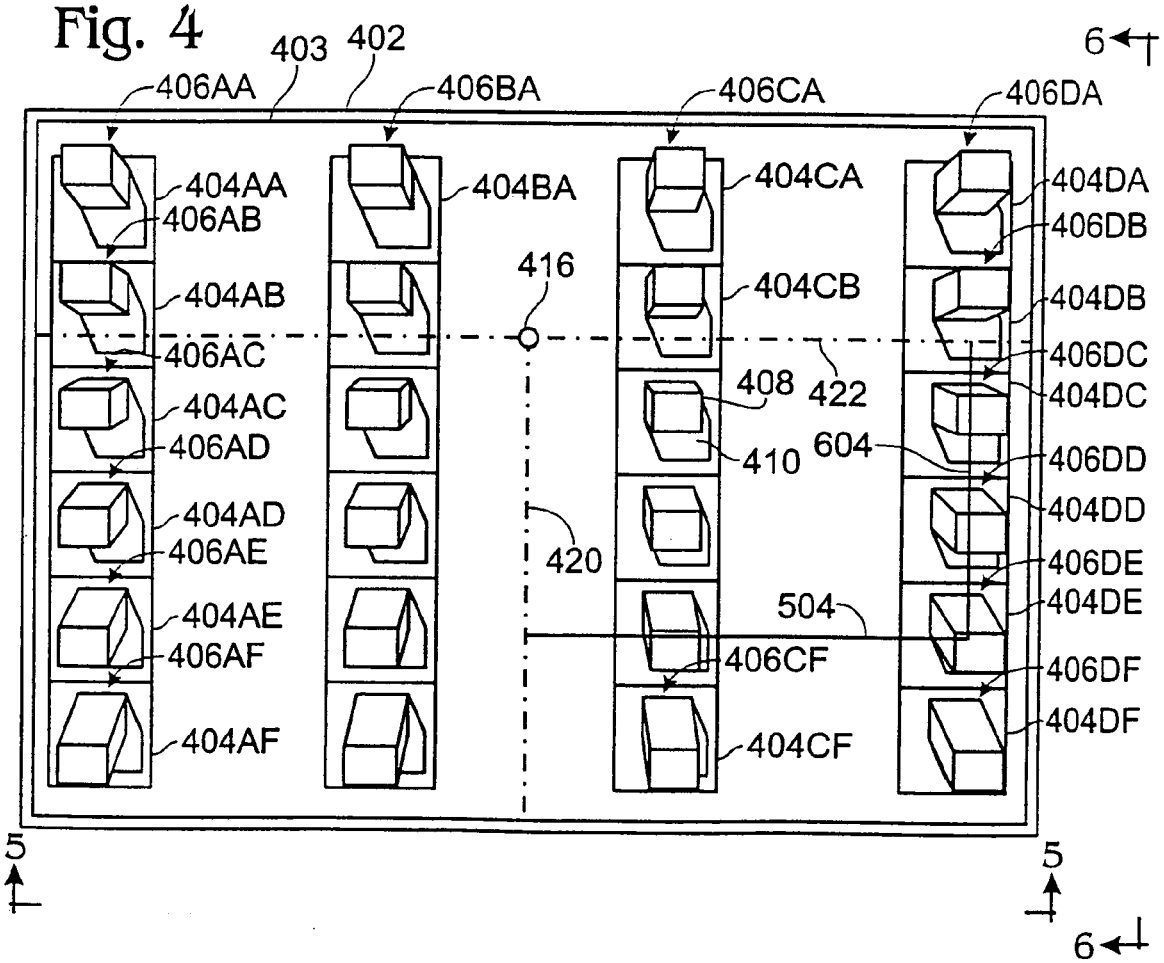
FIG. 4 is a front view illustration of a display screen having rendered thereon an exemplary two-dimensional array of view-dependent sprited tiles having respective textures that are of a simplified structure in the form of a solid block casting a shadow.

FIG. 4 is a front view illustration of a display screen 402 having rendered thereon an image surface 403 with an exemplary two-dimensional array of view-dependent sprited tiles 404AA-404DF having respective textures 406AA-406DF that are of a simplified structure in the form of a solid block 408 (only one numbered) casting a shadow 410 (only one numbered). Shadow 410 represents the result of an illumination source (not shown) that enhances the representation of textures 406, as is common in the field of texture mapping.

It will be appreciated that view-dependent sprited tiles according to the present invention could be of arbitrary complexity and include arbitrary levels of imaging and that the detail of textures 406 has been simplified for purposes of illustration. In a texture mapping, sprited tiles 404 are applied to a surface of an image geometry to increase the detail and realism in an image rendered for a user on a display screen 402. In this context, image geometry refers to an image surface to be rendered on a video display and is not a limited to image objects representing solid articles.

Sprited tiles 404M-404DF provide different views of block 408 in respective textures 406M-406DF. The different views of block 408 correspond to different horizontal viewing angles 412 and vertical viewing angles 414 at which the user can see tiles 404. In this implementation, tiles 404 are two-dimensional representations of three-dimensional structures. Viewing angles 412 and 414 are determined with respect to a selected user viewpoint 416. Being based upon horizontal and vertical viewing angles, tiles 404 are considered to be view dependent in two (angular) dimensions or, alternatively, a two-dimensional array of sprited tiles.

Horizontal viewing angle 412 and vertical viewing angle 414 are illustrated for exemplary tile 404DE, but viewing angles 412 and 414 for remaining tiles 404 are determined in the same manner. User viewpoint 416 is positioned relative to horizontal and vertical coordinate axes (not shown) on display screen 402. Viewpoint 416, like viewpoint 216, is selected to represent an average or typical viewing distance and position for many users.

Figure 5:
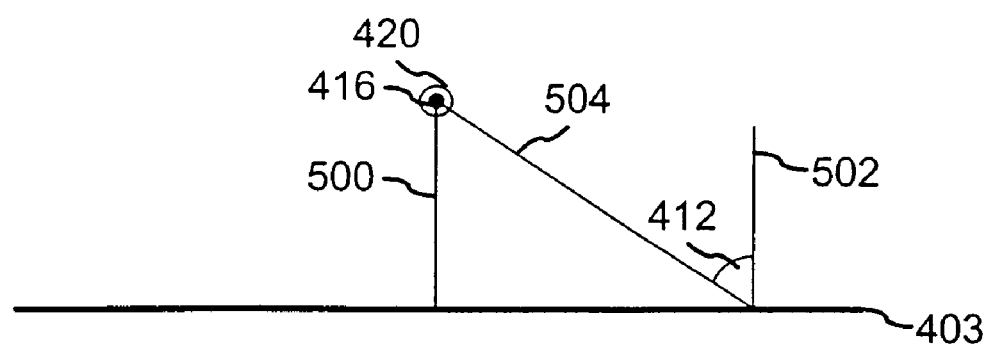
FIG. 5 is a bottom end view of a display screen to illustrate horizontal viewing angle.

FIG. 5 is a bottom end view of image surface 403 to illustrate horizontal viewing angle 412. Image surface 403 is shown as being flat for purposes of illustration, but in practice could be of arbitrary shape. Referring to FIGS. 4 and 5, the horizontal position of user viewpoint 416 establishes a vertical viewpoint line 420 that is parallel to display screen 402 and spaced apart from image surface 403 by a distance 500. The horizontal viewing angle 412 at a selected position on image surface 403 (e.g, tile 404DE) is determined as the horizontal angle between a normal 502 extending from image surface 403 at the selected position and a viewing line 504 extending from the selected position to vertical viewpoint line 420.

Figure 6:
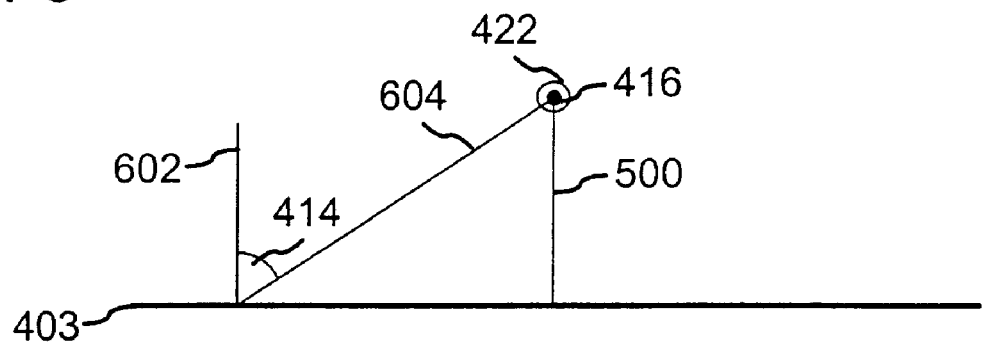
FIG. 6 is a side end view of a display screen to illustrate vertical viewing angle.

FIG. 6 is a side end view of image surface 403 to illustrate vertical viewing angle 414. Referring to FIGS. 4 and 6, the vertical position of user viewpoint 416 establishes a horizontal viewpoint line 422 that is parallel to display screen 402 and spaced apart from it by the distance 500. The vertical viewing angle 414 at a selected position on image surface 403 (e.g, tile 404DE) is determined as the vertical angle between a normal 602 extending from image surface 403 at the selected position and a viewing line 604 extending from the selected position to horizontal viewpoint line 422.

Multiple tiles 404 may be predetermined for use over a range of viewing angles. It will be appreciated, however, that for a one-dimensional-array of N-number of sprited tiles (e.g., tiles 202), a two-dimensional-array of sprited tiles (e.g., tiles 404) of corresponding resolution would have $N^2$-number of tiles. Alternatively, a two-dimensional array of tiles could use fewer numbers of represented views to decrease the overall number of tiles. Also, the resolution of each of the tiles need not be the same. For instance tiles representing views that are at larger viewing angles might be at lower resolutions and require fewer pixels.

With the exemplary viewpoint 416 positioned at about the horizontal middle of display screen 402, positive and negative horizontal viewing angles 412 would be equally included in the range of viewing angles. Accordingly, for each tile 404 having a positive viewing angle there would also typically be a tile 404 with a negative viewing angle of the same absolute value. This would reflect the typical user viewpoint 416 as being generally horizontally centered with regard to display screen 402.

In this implementation, each of tiles 404 would correspond to a particular horizontal and vertical viewing angle segment within the range of viewing angles 412 and 414. The viewing angle segments that are assigned to tiles 404 may be distributed uniformly over the viewing angle ranges or may be distributed in any nonuniform manner. For example, the density of tiles may be concentrated near the normal (i.e., 0°) viewing angles to provide greatest imaging quality according to the texture and application.

Figure 7:
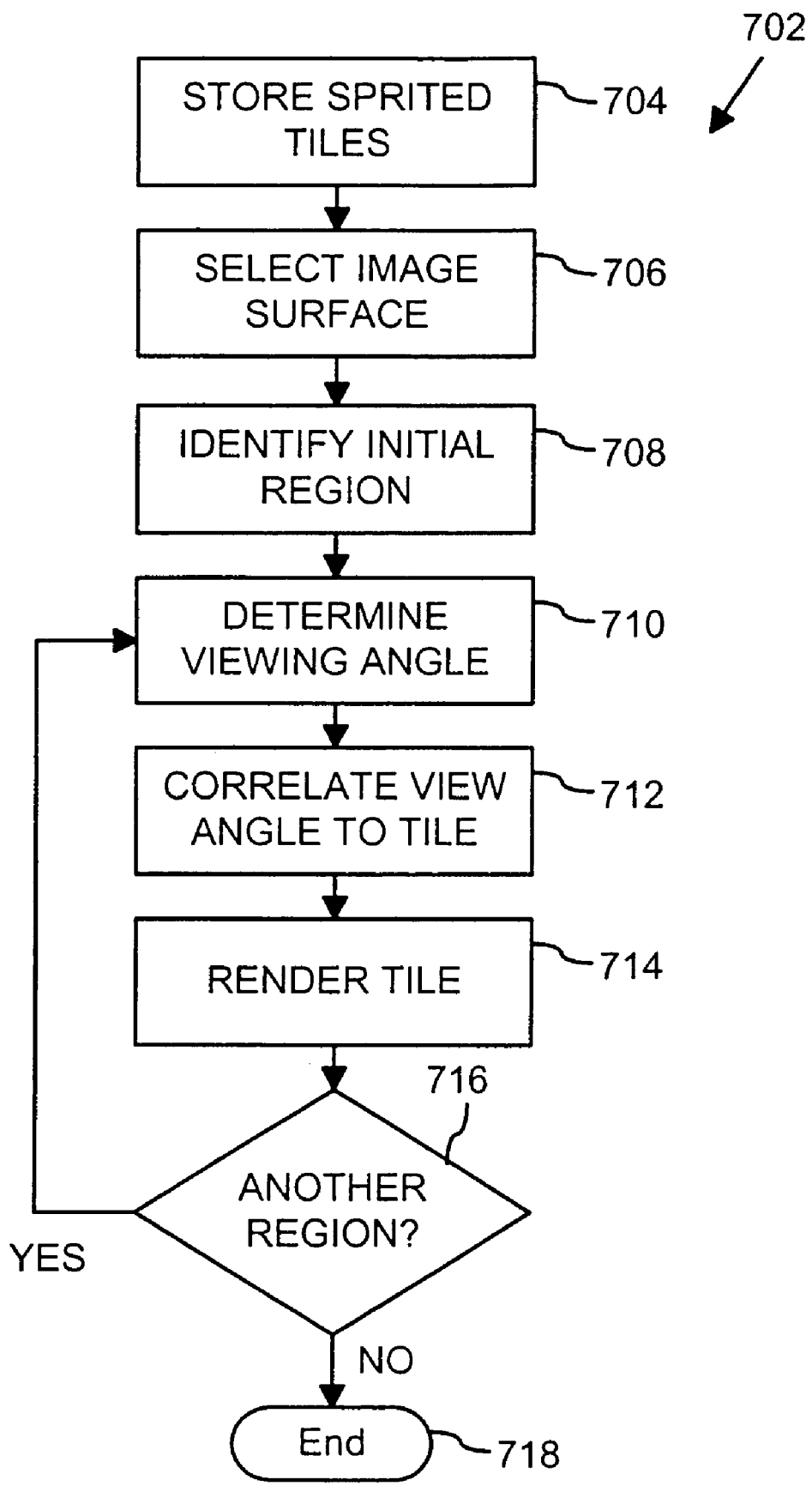
FIG. 7 is a flow diagram of a texture mapping method for rendering a texture on an image surface to be displayed for a user.

FIG. 7 is a flow diagram of a texture mapping method 702 for rendering a texture on an image surface to be displayed for a user. Method 702 is described as mapping a one-dimensional array of sprited tiles (e.g., tiles 202) to an image surface. For purposes of generalization, this description notes differences between the mapping of one- and two-dimensional arrays of sprited tiles (e.g., tiles 202 and 404, respectively). Method 702 is described with reference to a predefined set of sprited tiles 202. It will be appreciated, however, that tiles 202 could alternatively be determined in real-time, as described below with reference to FIG. 8.

Process block 704 indicates that a set of sprited tiles are stored in a computer readable medium to be available for the texture mapping process. Each sprited tile is correlated with a viewing angle range segment. The viewing angle range segments of the different sprited tiles may or may not be of equal angular extent or resolution.

Process block 706 indicates that an image surface is selected to be textured with tiles 202.

Process block 708 indicates that an initial region of the image surface is identified. The initial region is of the size of the sprited tiles, or a segment of one of them. The initial region could be selected in any manner. For example, the initial region could be selected as the portion of the image surface that is at the right-most extent of the highest level of the image surface on the display screen.

Process block 710 indicates that a viewing angle is determined for the identified region of the image surface. With reference to FIG. 3, for example, the horizontal viewing angle is determined as the horizontal angle between a normal 224 extending from the image surface at the selected position and a viewing line 216 extending from the selected position to viewpoint 212. In a two-dimensional implementation, horizontal and vertical viewing angles, for example, are determined.

Process block 712 indicates that the determined viewing angle is correlated with the sprited tile having the viewing angle range segment in which the determined viewing angle falls.

Process block 714 indicates that the sprited tile correlated with the viewing angle, or a portion of the tile, is rendered on the identified region of the image surface. A portion of a sprited tile could be rendered, for example, along an edge or boundary of the image surface, as is known in the art for conventional texture mapping.

Query block 716 represents an inquiry as to whether the image surface includes another region to be texture mapped. Subsequent regions to be mapped may be identified in any of a variety of ways or sequences as is known in the art. Whenever the image surface includes another region to be texture mapped, query block 716 returns to process block 710. Otherwise, query block 716 proceeds to termination block 718.

Figure 8:
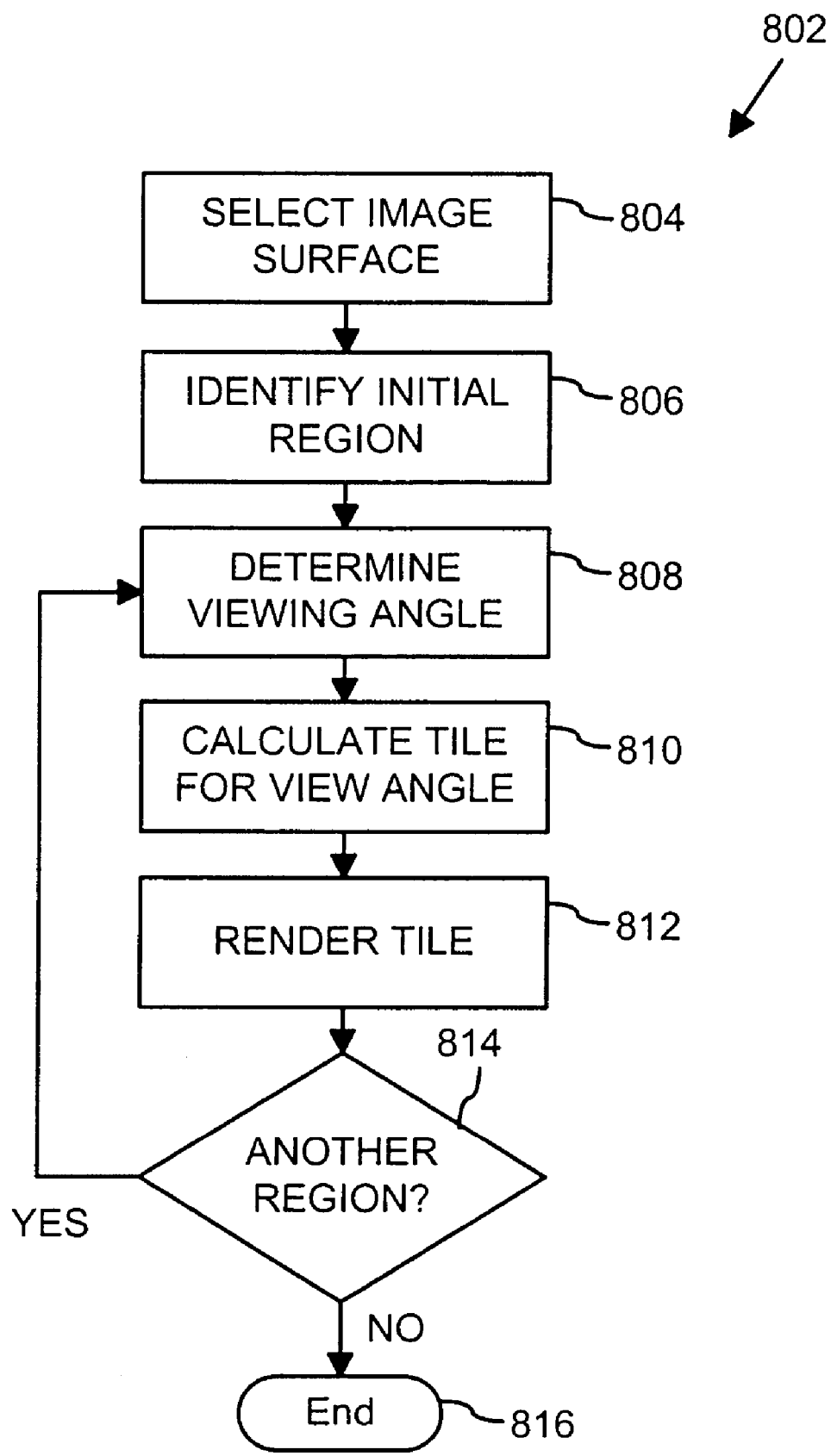
FIG. 8 is a flow diagram of another texture mapping method for rendering a texture on an image surface to be displayed for a user.

FIG. 8 is a flow diagram of another texture mapping method 802 for rendering a texture on an image surface to be displayed for a user. Method 802 is also described as mapping to an image surface a one-dimensional array of sprited tiles (e.g., tiles 202) that are determined in real-time.

Process block 804 indicates that an image surface is selected to be textured with tiles 202.

Process block 806 indicates that an initial region of the image surface is identified. The initial region is of the size of the sprited tiles, or a segment of one of them. The initial region could be selected in any manner. For example, the initial region could be selected as the portion of the image surface that is at the right-most extent of the highest level of the image surface on the display screen.

Process block 808 indicates that a viewing angle is determined for the identified region of the image surface.

Process block 810 indicates that a sprited tile is determined or calculated by applying a projection (e.g., an oblique parallel projection) at the determined viewing angle to an image geometry corresponding to the tile. As an alternative, the determined viewing angle may be correlated with one of multiple viewing angle range segments, and the sprited tile may be calculated with respect to a selected viewing angle in substitution for determined viewing angles that fall within the viewing angle range segment. For example, a selected viewing angle of 12.5° could be substituted a determined viewing angle of 11°, or any other determined viewing angles falling within in a viewing angle range segment of 10°-15°.

Process block 812 indicates that the determined sprited tile, or a portion of the tile, is rendered on the identified region of the image surface. A portion of a sprited tile could be rendered, for example, along an edge or boundary of the image surface, as is known in the art for conventional texture mapping.

Query block 814 represents an inquiry as to whether the image surface includes another region to be texture mapped. Subsequent regions to be mapped may be identified in any of a variety of ways or sequences as is known in the art. Whenever the image surface includes another region to be texture mapped, query block 814 returns to process block 808. Otherwise, query block 814 proceeds to termination block 816.

Texture mapping methods 702 and 802 provide texture mapping having improved depth characteristics over conventional texture mapping. It will be appreciated, however, that certain artifacts can be discerned by a viewer under some imaging conditions when a tile of one viewing angle is applied for all the viewing angles in a viewing angle range segment. If the viewer distance is small relative to the tile size, the tiles corresponding to some viewing angles might be skipped, resulting in discernible differences between adjacent tiles corresponding to non-adjacent viewing angle segments.

A related artifact can arise as the viewer distance to a tile decreases (e.g., the viewer moves closer to the tile). In this circumstance, the viewing angles to opposed sides of a single tile can differ sufficiently that two different view-dependent tiles could correspond to the two viewing angles. Selection of one tile over another in this circumstance will lead to an artifact. (In one implementation, viewing angles are determined with reference to the centers of the tiles.) In other implementations, for example, texture mapping processes 702 and 802 could blur, blend, or morph between selected tiles of different viewing angles to improve accuracy of resultant images over a wider set of angles and reduce artifacts from insufficient resolution of angles. Morphing is a process by which one image is gradually transformed into another, creating the illusion of a metamorphosis.

Texture mapping methods 702 and 802 apply sprited tiles to image surfaces to provide more realistic images. The geometrical complexity of the sprited tiles correlates with the increased realism that the sprited tiles can provide. But increased geometrical complexity also requires computer systems with correspondingly greater rendering speed, texture storage, and mapping speed. As a result, the geometrical complexity of the sprited tiles is typically balanced against the increased realism of images with the sprited tiles to provide suitably realistic images that accommodate the resources and capabilities of the computer systems.

The view-dependent image characteristics of the sprited tiles are provided by projecting a texture structure (e.g., block 206) according to views corresponding to the different viewing angles. A projection is a mathematical technique or function for converting a three-dimensional representation into two-dimensional representation (e.g., on a projection plane) to be rendered on a display screen. The two common graphics imaging projections are perspective and orthographic projections.

Figure 9:
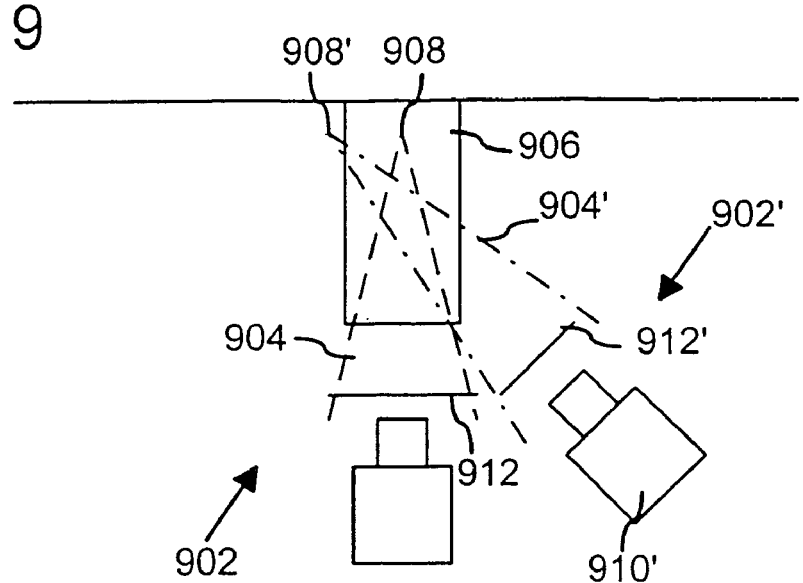
FIG. 9 illustrates two examples of a conventional prior art perspective projection at different viewing angles.

FIG. 9 illustrates two examples of conventional prior art perspective projection 902 (902') at different viewing angles. Perspective projections have converging projection lines 904 (904') from an image 906 pass through a common point 908 (908'), called the center of projection, to achieve depth realism for a viewer or "camera" 910 (910') viewing an image plane 912 (912'). The problem with using perspective projection to generate tiles is that perspective foreshortening ends up being applied twice, once when rendering the tile and a second time when rendering the resultant scene. This results in an unrealistic resultant image.

Figure 11:
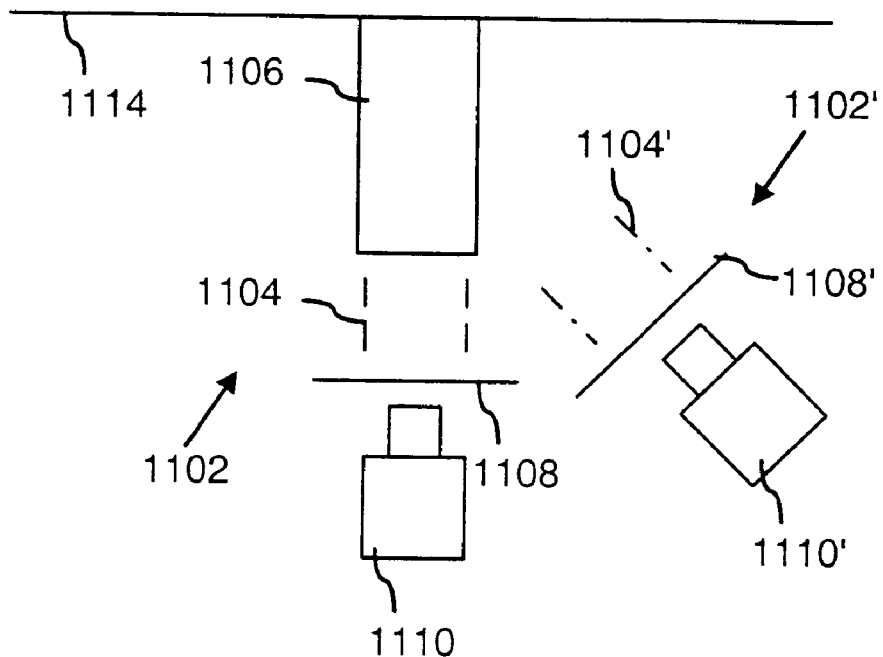
FIG. 11 illustrates two examples of a conventional prior art orthographic projection at different viewing angles.

FIG. 11 illustrates two examples of conventional prior art orthographic projection 1102 (1102') at different viewing angles. Orthographic projections have parallel projection lines 1104 (1104') from an image 1106 and perpendicular to an image plane 1108 (1108') viewed by a viewer or "camera" 1110 (1110'). Alternately, orthographic projection 1102 (1102') may be characterized as viewer or "camera" 1110 (1110') viewer observing image plane 1108 (1108') along a normal to image plane 1108 (1108'). As illustrated by projection lines 1104', an image plane 1108' may be oriented at any angle to image 1106.

Figure 10A:
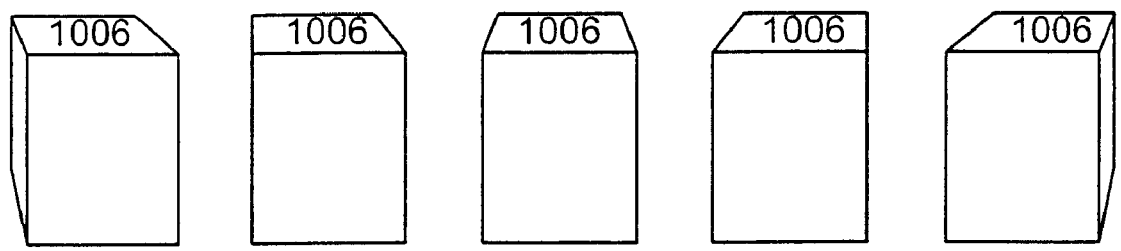
FIGS. 10A and 10B show different adjacent perspective views and illustrate imaging artifacts that arise from adjacent perspective views at different viewing angles.
Figure 10B:
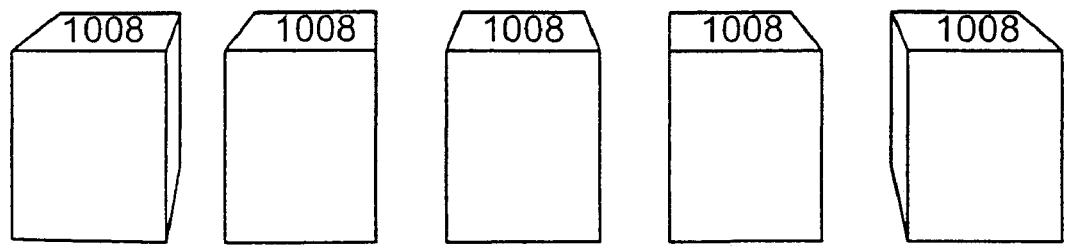

It has been determined that different adjacent orthographic projections have image artifacts analogous to those illustrated in FIGS. 10A and 10B. The image artifacts from orthographic projections arise from the apparent rotation of image planes 912 (912') and 1108 (1108') for different viewing angles changing the dimensions, including the shapes, of front surfaces of texture objects. In this context, a front surface is the generally major surface of a texture object which surface is about parallel to the plane of a tile, such as front surfaces 1006 and 1008 in FIGS. 10A and 10B. In many applications, such image artifacts would be unacceptably noticeable in view-dependent sprited tiles 202 or 404.

Hence, neither the perspective projection nor the orthographic projection is suitable for the sprited tiles utilized in texture mapping processes 702 and 802. A texture mapping generated with sprited tiles generated with these projections would appear improper.

Figure 12:
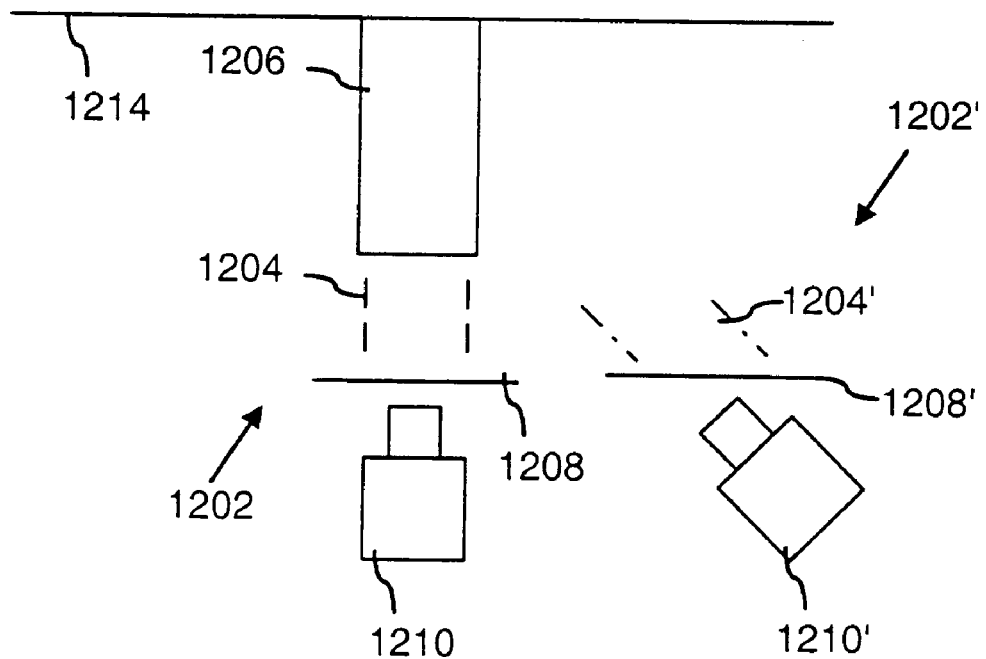
FIG. 12 illustrates two examples of an oblique parallel projection at different viewing angles.

FIG. 12 illustrates two examples of oblique parallel projection 1202 (1202') at different viewing angles. Oblique parallel projections have parallel projection lines 1204 (1204') from an image 1206 imaged on an image plane 1208 (1208') of fixed orientation viewed by a viewer or "camera" 1210 (1210'). As illustrated, image plane 1208 (1208') is parallel to an object plane 1214 for image 1206. In some applications, image plane 1108 (1108') and object plane 1114 could be oblique to each other.

In one implementation, sprited tiles for use in texture mapping process 702 are generated according to oblique parallel projection 1202 (1202'), or an approximation of it. Oblique parallel projection 1202 (1202') is characterized by different viewing angles being imaged on a common image plane, thereby avoiding perspective foreshortening and apparent rotation of the image plane with different viewing angles. In addition, for images 1206 having front faces (e.g., surfaces 1216), this preserves the relative sizes of the front faces of the images 1206. As a result, sprited tiles for different viewing angles have perceptually consistent representations at different viewing angles and may be positioned adjacent each other in a texture mapping without introducing perceptual artifacts such as those from the perspective and orthographic projections.

It will be appreciated that some image geometries that could be included in the sprited tiles will not include front faces (e.g., surfaces 1216). Examples of simple geometries without front faces are spikes, pyramids, arbitrary bumps, and cones. Other complex geometries could also not include front faces. Application of oblique parallel projections to geometries without front faces maintains the benefits of avoiding perspective foreshortening and apparent rotation of the image plane with different viewing angles.

With image 1206 represented by a geometry model G in the form of, for example, a set of points as is known in the art, a sprited geometry model corresponding to each sprited tile may be represented by $G^\theta$ in the expression:

$$G^\theta = GMP^\theta(\text{parallel})$$

in which $P^\theta$(parallel) represents the oblique parallel projection matrix for a projection at an angle $\theta$ and M represents a modeling matrix that positions image plane 1208 to receive the oblique parallel projection of geometry model G. A conventional representation of the oblique parallel projection matrix $P^\theta$(parallel) is as:

$$\begin{bmatrix} 1 & 0 & 0 & 0 \\ 0 & 1 & 0 & 0 \\ 0 & 0 & 0 & 0 \\ 0 & 0 & 0 & 1 \end{bmatrix}$$

with the modeling matrix M represented as a 4×4 matrix having an upper left 3×3 submatrix for scaling and rotating points. An example of such a 3×3 matrix is:

$$\begin{bmatrix} \sin\theta & \cos\theta & 0 \\ -\cos\theta & \sin\theta & 0 \\ 0 & 0 & 1 \end{bmatrix}$$

which provides unitary scaling and rotation around the z axis by an angle $\theta$ in the clockwise direction. Rotation about other axes is similar. As is known in the art, scaling is provided by multiplicative constants (not shown) that are placed on the main diagonal terms for each axis. The bottom row of the 4×4 matrix comprises translation terms in each of the x, y, and z directions. With reference to the above exemplary 3×3 submatrix, an exemplary modeling matrix M may be represented as:

$$\begin{bmatrix} \sin\theta & \cos\theta & 0 & 0 \\ -\cos\theta & \sin\theta & 0 & 0 \\ 0 & 0 & 1 & 0 \\ x & y & z & 1 \end{bmatrix}$$

Application of a sprited tile $G^\theta$ to an image surface may be represented by the expression:

$$G^\theta M^\theta P(\text{perspective})$$

in which $M^\theta$ represents a modeling matrix that applies the sprited tile $G^\theta$ to an image surface and P(perspective) provides the final perspective projection of the texture mapped image.

A result of using oblique parallel projections to obtain sprited tiles is that individual tiles do not include perspective effects. While providing for enhanced depth characteristics among multiple tiles of different viewing angles, it will be appreciated that the sprited tiles should be relatively small relative to the viewing distance of the viewer so that the absence of perspective effects within the individual tiles is not noticeable by the viewer.

Figure 13:
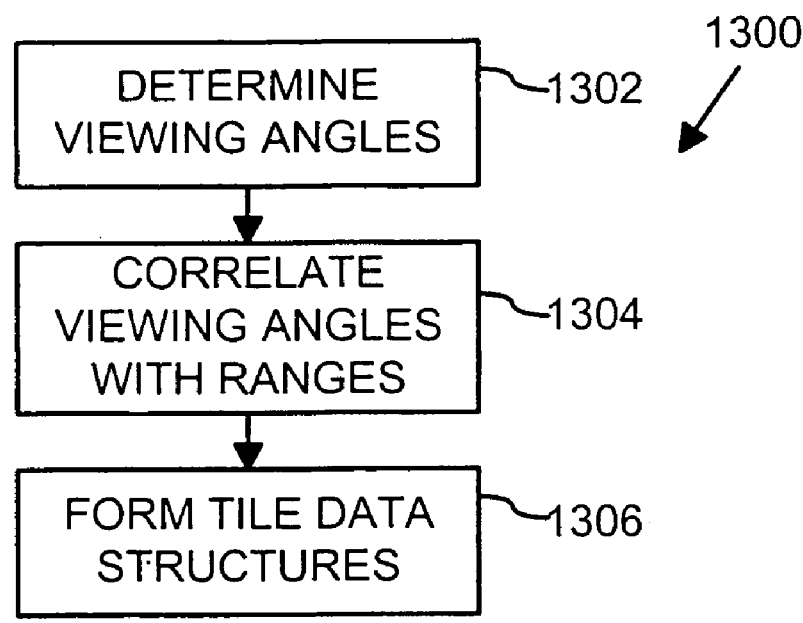
FIG. 13 is a flow diagram of a method of generating view dependent sprited tiles.

FIG. 13 is a flow diagram of a method 1300 of generating view dependent sprited tiles that each have an image texture.

Process block 1302 indicates that multiple selected viewing angles are determined for viewing the image texture.

Process block 1304 indicates that each selected viewing angle is correlated with a predetermined range of viewing angles that includes the selected viewing angle.

Process block 1306 indicates that for each of the selected viewing angles a data structure (e.g., a two-dimensional image) is formed to include a projection of the image texture relative to the selected viewing angles. In one implementation, the image texture includes a front surface with predetermined dimensions and the projections of the image texture relative to each of the selected viewing angles maintains the predetermined dimensions of the front surface of the image texture. For example, the projections may be oblique parallel projections.

An oblique parallel projection may be calculated or determined directly by conventional graphics imaging calculations. In another implementation, approximated oblique parallel projections may be determined by distorting the geometry of an image texture structure by skewing its geometry while maintaining the dimensions of the front surface of the texture solid. This may be done by displacing the points of the object in parallel to the view plane (or front plane) by a distance based on the angle of the viewpoint. Points to the rear of the object are displaced small amounts, and points to the front are displaced further. In yet another implementation, approximated oblique parallel projections may be determined by obtaining orthographic projections at different viewing angles and warping those projections so the dimensions of the front surface of the texture solid are maintained. The approximated oblique parallel projections are illustrated because relatively few commercial graphics imaging tools support oblique parallel projections.

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

For example, the illustrated embodiments have been directed to texture mappings as predominantly structural representations (e.g., solid block 206). The illustrated embodiments also include, but do not emphasize, an illumination feature in the form of shadows (e.g. shadows 208). It will be appreciated that texture mapping tiles according to the present invention may, in addition or as alternatives to structural features, employ color, shading, illumination, transparency, as well as other image attributes commonly used in texture mapping. The tiles may also include effects such as filtering, distance attenuation, reflection, and specular effects. For example, a shiny metallic wall reflecting light from the sun would have highlights only at particular angles. Also, another implementation could account for viewpoint distance, in addition to accounting for viewing angle as described, so that different tiles could be used to simulate haze or fog when seen from different distances. It will also be appreciated that alternatives to the oblique parallel projection could be applied to the sprited tiles. For example, in an implementation in which image realism or accuracy is not necessarily a rendering goal, tiles may be morphed between each other or "hand-painted" or otherwise formed manually by a sprited tile designer.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

The invention claimed is:

1. A computer-readable medium having stored thereon plural tile data structures corresponding to plural tiles, each tile representing an image texture for tiled texture mapping, comprising:

the plural tile data structures associated with a range of viewing angles from a user viewpoint to the plural tiles, each tile data structure representing a different segment of viewing angles of the range of viewing angles, the plural tile data structures to be used to display the tiles together on a display screen immediately adjacent each other.

2. The medium of claim 1 in which the viewing angles are not distributed equally among the segments.

3. The medium of claim 2 in which the segments closest to the user viewpoint are smaller that the segments farthest from the user viewpoint.

4. The medium of claim 1 in which the viewing angles are distributed equally among the segments.

5. The medium of claim 1 in which the range of viewing angles extends over viewing angles of positive and negative magnitudes relative to the user viewpoint.

6. The medium of claim 5 in which the segments of viewing angles of positive magnitudes to which tile data structures correspond are matched one-to-one with the segments of viewing angles of negative magnitudes to which tile data structures correspond.

7. The medium of claim 1 in which the range of viewing angles are within only one angular dimension.

8. The medium of claim 7 in which the one angular dimension is a horizontal angular dimension corresponding to angles within a horizontal imaging plane.

9. The medium of claim 1 in which the range of viewing angles are within only two angular dimensions.

10. The medium of claim 9 in which the two angular dimensions are a horizontal angular dimension corresponding to angles within a horizontal imaging plane and a vertical angular dimension corresponding to angles within a vertical imaging plane.

11. The medium of claim 1 in which the image texture includes an outer surface and the outer surface is of the same dimension in each of the segment views of the image texture.

12. The medium of claim 1 in which the range of viewing angles of the image texture are based upon morphings of the image texture.

13. The medium of claim 1 in which the range of viewing angles of the image texture are based upon manually formed renderings of the image texture.

14. A method of generating a tile data structure in a computer readable medium representing an image texture for a tiled texture mapping, comprising:
   determining plural selected viewing angles for viewing together plural adjacent tiles of the image texture, the plural selected viewing angles included in a range of viewing angles from a user viewpoint to the plural adjacent tiles;
   correlating each of the plural selected viewing angles to a corresponding tile, each tile associated with a segment of viewing angles of the range of viewing angles, immediately successive segments of viewing angles being correlated to adjacent tiles of the image texture; and
   based on the correlation, forming for each of the selected viewing angles a tile data structure containing at least one of the plural projections of the image texture relative to the respective selected viewing angle.

15. The method of claim 14 in which the image texture includes a front surface with predetermined dimensions and the plural projections of the image texture relative to the respective selected viewing angle maintain the predetermined dimensions of the front surface of the image texture.

16. The method of claim 14 in which the plural selected viewing angles are within only one angular dimension.

17. The method of claim 14 in which the plural selected viewing angles are within only two angular dimensions.

18. The medium of claim 14 in which at least one of the plural projections of the image texture is based upon a morphing of the image texture.

19. The medium of claim 14 in which at least one of the plural projections views of the image texture is based upon manually formed renderings of the image texture.

* * * * *